(12) United States Patent
Gottmann

(10) Patent No.: US 8,273,487 B2
(45) Date of Patent: Sep. 25, 2012

(54) FUEL CELL SYSTEM WITH FUEL DISTILLATION UNIT

(75) Inventor: Matthias Gottmann, Sunnyvale, CA (US)

(73) Assignee: Bloom Energy Corporation, Sunnyvale, CA (US)

(*) Notice: Subject to any disclaimer, the term of this patent is extended or adjusted under 35 U.S.C. 154(b) by 239 days.

(21) Appl. No.: 11/522,976

(22) Filed: Sep. 19, 2006

(65) Prior Publication Data

US 2008/0070077 A1 Mar. 20, 2008

(51) Int. Cl.
*H01M 8/06* (2006.01)
*B01D 24/00* (2006.01)

(52) U.S. Cl. ........ 429/410; 429/415; 429/423; 429/429; 429/448; 429/440; 205/343; 210/664

(58) Field of Classification Search .................. None
See application file for complete search history.

(56) References Cited

U.S. PATENT DOCUMENTS

| | | | |
|---|---|---|---|
| 5,736,026 A * | 4/1998 | Patel et al. | 205/343 |
| 6,423,896 B1 * | 7/2002 | Keegan | 136/253 |
| 2002/0168557 A1 * | 11/2002 | Grieve et al. | 429/17 |
| 2004/0219400 A1 * | 11/2004 | Al-Hallaj et al. | 429/13 |
| 2005/0120715 A1 * | 6/2005 | Labrador | 60/618 |
| 2006/0127714 A1 * | 6/2006 | Vik et al. | 429/19 |

FOREIGN PATENT DOCUMENTS

WO WO2004025767 A * 3/2004

* cited by examiner

*Primary Examiner* — Keith Walker
(74) *Attorney, Agent, or Firm* — The Marbury Law Group PLLC

(57) ABSTRACT

A fuel purification system includes a fuel cell stack and a fuel purification unit, such as a distillation unit. The fuel cell stack is adapted to provide heat to the fuel purification unit, and the fuel purification unit is adapted to provide a purified fuel to the fuel cell stack.

12 Claims, 4 Drawing Sheets

FUEL CELL SYSTEM WITH FUEL DISTILLATION UNIT

BACKGROUND OF THE INVENTION

The present invention is generally directed to fuel cells and more specifically to fuel cell systems that are integrated with distillation systems.

There is a tremendous potential for the use of ethanol and other oxygenated hydrocarbon fuels in environmentally-friendly and fossil-fuel-independent power generation. However, one of the key drawbacks in using ethanol and similar fuels is the energy-intensive purification of these fuels.

For instance, ethanol produced by fermentation requires a high temperature distillation step to remove water before it can be used in combustion engines. Existing processes for distilling ethanol require the addition of external energy to purify the ethanol. This drawback in the use of ethanol and similar hydrocarbon fuels threatens the economic viability of oxygenated hydrocarbons as a future energy source.

BRIEF SUMMARY OF THE INVENTION

An embodiment of the present invention provides a fuel purification system comprising a fuel cell stack and a fuel purification unit. The fuel cell stack is adapted to provide heat to the fuel purification unit and the fuel purification unit is adapted to provide purified fuel to the fuel cell stack.

DETAILED DESCRIPTION OF THE PREFERRED EMBODIMENTS

A fuel cell system is integrated with a fuel purification unit, such as a distillation unit, to provide the power and/or heat to the fuel purification unit in order to operate the fuel purification unit. Thus, a separate power and/or heat source which provides electrical energy and/or thermal energy to the fuel purification unit is not required. Accordingly, a fuel cell system, such as a solid oxide fuel cell, a molten carbonate fuel cell or a proton exchange membrane fuel cell system, can be supplied with a low purity fuel source that is then purified to levels where it becomes suitable to power the fuel cells of the system. For instance, the purified fuel may be suitable for steam reformation before being provided into the fuel cells.

The manufacturing processes used to make oxygenated hydrocarbons, such as hydrocarbons comprising aldehydes, ketones, alcohols, acids, and nitrates, for use as a fuel typically require additional purification steps. For instance, ethanol produced by ethylene hydration or fermentation results in a mixture of ethanol and water that is not sufficiently pure to power a fuel cell. For use as a fuel source to power a fuel cell, ethanol must be mostly free of water, which requires energy-intensive purification, such as fractional distillation, vacuum distillation, pressure-swing distillation, drying, material separation agents, or molecular sieve filtration.

The heat available in the exhaust stream or streams of a fuel cell, for instance the heat available in the air exhaust and/or the fuel cell exhaust streams, is used to drive a fuel purification process, such as a distillation process, in which a low purity fuel source, such as ethanol, is purified to levels where it becomes suitable to power a fuel cell, for instance, suitable for steam reformation.

This system of the embodiments of the invention is not restricted to ethanol fuel sources. It is suitable for any hydrocarbon fuel that requires purification at temperatures that can be provided in whole or in part by fuel cells. The quantity of heat available from a fuel cell stack, such as a solid oxide fuel cell, a molten carbonate fuel cell or a proton exchange membrane fuel cell stack, can easily exceed temperatures of 85° C. to 120° C. typically required for such purification processes.

Fuel cells are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels, specifically oxygenated hydrocarbon fuels, more specifically hydroxylated hydrocarbon fuels, for instance ethanol and methanol. There are classes of fuel cells, such as the solid oxide regenerative fuel cells, that also allow reversed operation, such that oxidized fuel can be reduced back to unoxidized fuel using electrical energy as an input.

Figure 1A:
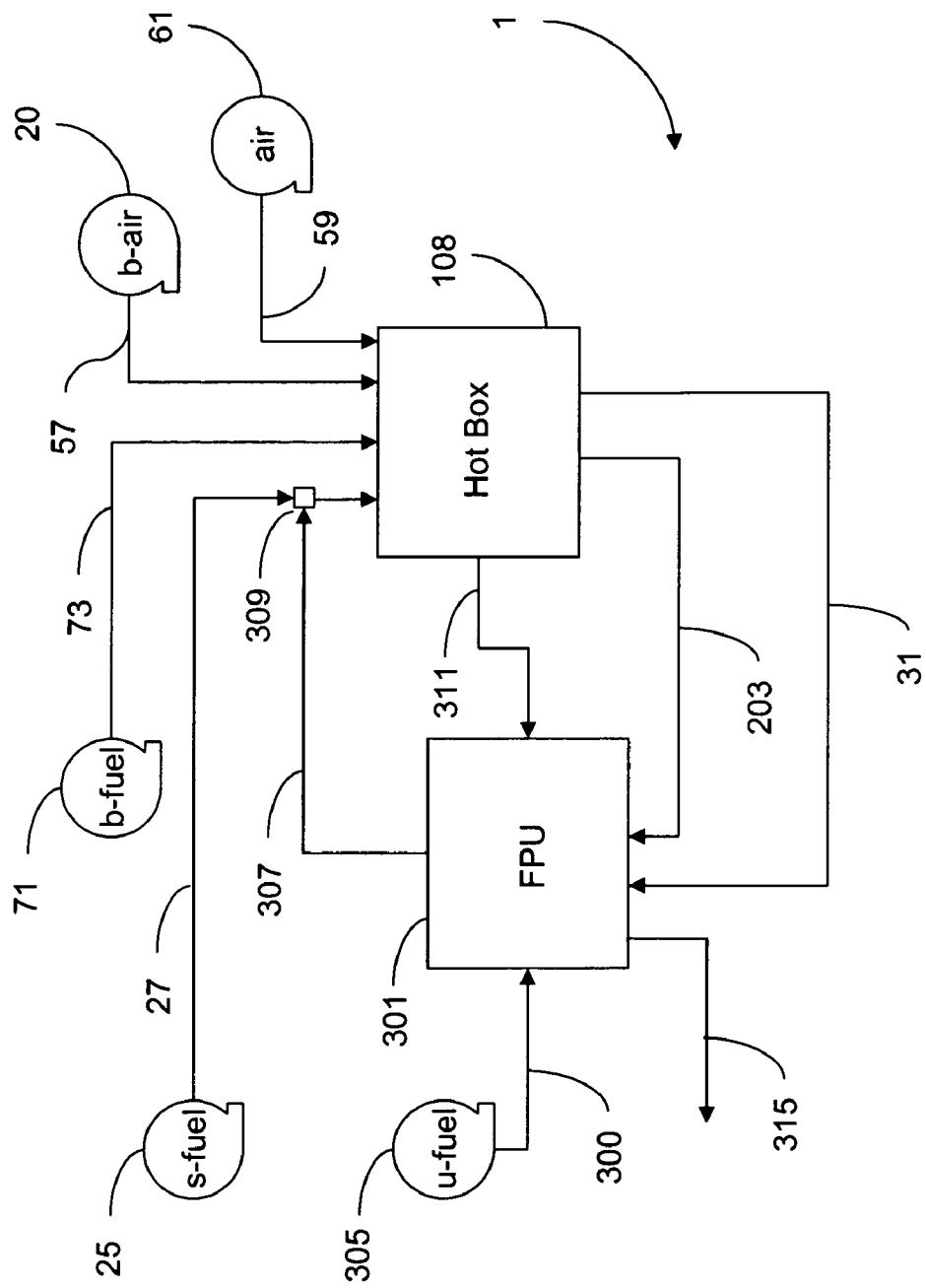
FIG. 1A is a schematic of a fuel cell system with fuel purification according to embodiments of the invention.

FIG. 1A illustrates a fuel cell system 1. The system contains a hot box 108 in which a fuel cell stack and auxiliary components are located. The contents of the hot box 108 are illustrated in detail in FIG. 1B and are described in more detail below. The fuel cell system 1 preferably comprises a high temperature fuel cell system, such as a solid oxide fuel cell (SOFC) system or a molten carbonate fuel cell system. The system 1 may be a regenerative system, such as a solid oxide regenerative fuel cell (SORFC) system which operates in both fuel cell (i.e., discharge) and electrolysis (i.e., charge) modes or it may be a non-regenerative system which only operates in the fuel cell mode. For example, the fuel cell system described in U.S. patent application Ser. No. 11/002,681, filed on Dec. 3, 2004, which is hereby incorporated by reference in its entirety, may be used.

The system also contains a fuel inlet conduit 27 which provides fuel from a startup fuel pump 25 to the fuel cell stack in the hot box 108 and an air inlet conduit 59 which provides air from a blower 61 to the stack in the hot box 108. Optionally, the system 1 also contains an optional burner or a combustor, as will be described in more detail with respect to in FIG. 1B. In this case, the system 1 also contains a burner fuel delivery conduit 73 and a burner air delivery conduit 57 which provide fuel and air, respectively, into the burner from a burner fuel pump 71 and a burner air blower 20, respectively.

The system 1 preferably also contains a fuel purification unit 301 which purifies an unpurified fuel, such a hydrocarbon fuel and water containing fuel stream. The fuel purification unit 301 is discussed in greater detail below with respect to in FIG. 2 and purifies the unpurified fuel using the heat available from the fuel cell stack and/or other hot box components, such as the burner. For instance, the heat available in the exhaust streams of the fuel cell stack and/or other hot box components is used to supply heat to the fuel purification unit 301, for instance to drive a distillation process. For instance, heat is available when the abundant moisture in the exhaust stream condenses. Preferably, at least one exhaust stream conduit 31, 203 from the fuel cell stack is provided to the fuel purification unit 301 in order use heat from at least one fuel cell stack exhaust stream to purify the fuel to levels suitable to power the fuel cell stack, for instance suitable for steam reformation. One or both the fuel (i.e., anode) and air (i.e., cathode) exhaust stream conduits 31, 203 are provided into the fuel purification unit to purify the unpurified fuel. The fuel cell stack may be electrically connected to the fuel purification unit 301 via an electrical conduit 311 to provide electrical power to the fuel purification unit 301 or to any other components that require electrical power.

The unpurified fuel is provided into the fuel purification unit 301 from a fuel inlet conduit 300 using a fuel pump 305. Preferably, the fuel pump 305 is provided with electrical power from the fuel cell stack via the electrical conduit 311. Other fuel providing equipment may also be used. The unpurified fuel may be any suitable fuel that, when purified to appropriate levels, can power the fuel cell stack. For instance, the unpurified fuel is purified to levels where it becomes suitable for steam reformation.

The fuel purification unit 301 may comprise any suitable heat exchanger which heats unpurified fuel during the purification process. For example, the fuel purification unit 301 may comprise a counter flow or a co-flow heat exchanger in which the unpurified fuel flows through pipes and the hot air and/or fuel exhaust gas from conduits 31, 203 flows around the outside of the pipes to raise the temperature of the unpurified fuel inside the pipes to a suitable temperature, for instance to a temperature above the unpurified fuel's boiling point. If both air and fuel exhaust gases are provided into the fuel purification unit 301, then each gas may be provided into a different part of the fuel purification unit to heat the unpurified fuel sequentially and to avoid mixing of the air and fuel exhaust gases. Optionally, an additional heater may be placed in the fuel purification unit 301 in order to provide additional heat to the unpurified fuel. Optionally, the additional heater is provided with electrical power from the fuel cell stack via the electrical conduit 311. Optionally, other heat removal mechanisms may be used to transport heat from a fuel cell stack to the purification unit 301 instead of or in addition to one or both stack exhaust streams 31, 203. These heat removal mechanisms may comprise radiative, convective and/or other mechanisms, such as radiative coupling between the stack and components of the purification unit 301, providing a heated air stream to the purification unit 301 after the stream is passed through the hot box 108 to cool the hot box components, heat conduction between components through walls of the system, etc.

Once purified by the fuel purification unit 301, the purified fuel is provided to a gas flow splitter, such as a manually or computer controlled valve 309, through a purified product conduit 307. The purified fuel is provided by the splitter 309 to the fuel cell stack in the hot box 108. The amount of fuel to be provided to the fuel cell stack may be controlled by the splitter 309. Once the fuel purification unit 301 has purified a sufficient quantity of fuel to power the fuel cell stack, the splitter 309 is adjusted to allow the fuel purification unit 301 to supply all or part of the fuel required to power the fuel cell stack. Optionally, the purified fuel from the fuel purification unit 301 is mixed with the fuel provided by the startup fuel pump 25. Optionally, the contaminants in the unpurified fuel, such as water, that are extracted from the fuel during the purification process, for example by distillation or by filtration, are removed from the fuel purification unit 301 by a waste conduit 315.

Figure 1B:
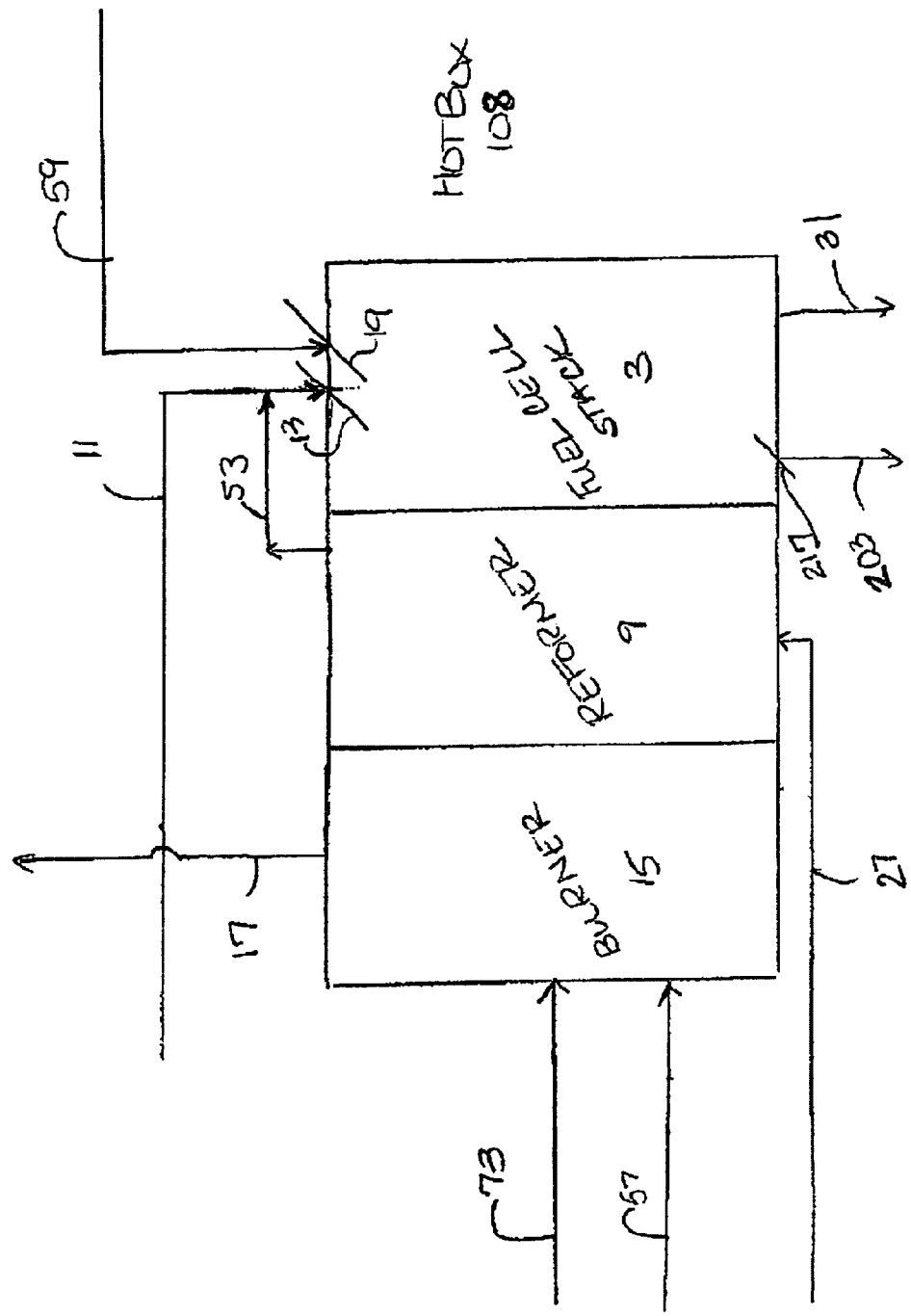
FIG. 1B is a schematic of a hot box portion of the system of FIG. 1A.

FIG. 1B illustrates details of a portion of the fuel cell system 1 which is located in the hot box 108 shown in FIG. 1A. The fuel cell system contains one or more fuel cell stacks 3, each of which contains a plurality of high temperature fuel cells. Each fuel cell contains an electrolyte, an anode electrode on one side of the electrolyte in an anode chamber, a cathode electrode on the other side of the electrolyte in a cathode chamber, as well as other components, such as separator plates/electrical contacts, fuel cell housing and insulation. In an SOFC operating in the fuel cell mode, the oxidizer, such as air or oxygen gas, enters the cathode chamber, while the fuel, such as hydrogen or hydrocarbon fuel, enters the anode chamber. Any suitable fuel cell designs and component materials may be used.

The fuel cells of the stack 3 may be internal reformation type fuel cells. Fuel cells of this type contain a fuel reformation catalyst in the anode electrode and/or in the anode chamber to allow the hydrocarbon fuel, such as an oxygenated hydrocarbon fuel, to be reformed internally on or adjacent to the fuel cell anode electrodes. Alternatively, the fuel cells may be external reformation type fuel cells. Fuel cells of this type require an external reformer 9 either because these fuel cells lack the fuel reformation catalyst in the anode electrode and/or in the anode chamber, or because the internal reformation catalyst may not be able to reform a desired amount of hydrocarbon fuel. Thus, the fuel reformation may be internal, external or partially internal and partially external (i.e., reformation in the reformer and in the fuel cells). A purified fuel from the purification unit 301 is preferably internally and/or externally steam reformed prior to being utilized in the fuel cells of the fuel cell stack 3 to generate electricity. If the reformer 9 is present in the system 1, then this reformer is preferably located separately from but thermally integrated with the high temperature fuel cell stack 3 to support the endothermic reaction in the reformer 9 and to cool the stack 3. The system also preferably contains a burner or combustor 15. Thus, the system comprises a thermally integrated reformer 9, combustor 15 and stack 3. The reformer 9 may be heated by the stack cathode exhaust, by radiative and convective heat from the stack and/or by the combustor heat during steady state operation.

The term "thermally integrated" in this context means that the heat from the reaction in the fuel cell stack 3 drives the net endothermic fuel reformation in the fuel reformer 9. As illustrated in FIG. 1B, the fuel reformer 9 may be thermally integrated with the fuel cell stack 3 by placing the reformer 9 and stack 3 in the same hot box 108 and/or in thermal contact with each other, or by providing a thermal conduit or thermally conductive material which connects the stack 3 to the reformer 9.

The stack 3 generates enough heat to conduct the steam reformation reaction in the reformer 9 during steady-state operation of the system 1. However, under some different operating conditions ranging from low to high stack efficiency and fuel utilization, the exothermic heat generated by the stack 3 and provided to the reformer 9 may be greater than, the same as or less than the heat required to support the reforming reaction in the reformer 9. The heat generated and/or provided by the stack 3 may be less than required to support steam reformation in the reformer 9 due to low fuel utilization, high stack efficiency, heat loss and/or stack failure/turndown. In this case, supplemental heat is supplied to the reformer 9. The system 1 provides the supplemental heat to the reformer 9 to carry out the reformation reaction during steady state operation. The supplemental heat may be provided from the burner or combustor 15 which is thermally integrated with the reformer 9 and/or from a cathode (i.e., air) exhaust conduit which is thermally integrated with the reformer 9. While less preferred, the supplemental heat may also be provided from the anode (i.e., fuel) exhaust conduit which is thermally integrated with the reformer. The supplemental heat may be provided from both the combustor 15 which is operating during steady state operation of the reformer (and not just during start-up) and from the cathode (i.e., air) exhaust of the stack 3. For example, the combustor 15 may be in direct contact with the reformer, and the stack cathode exhaust conduit 203 is configured such that the cathode exhaust contacts the reformer 9 and/or wraps around the reformer 9 to facilitate additional heat transfer. This lowers the combustion heat requirement for the reformation reaction.

Preferably, the reformer 9 is sandwiched between the combustor 15 and one or more stacks 3 to assist heat transfer as described in more detail below. For example, the reformer 9 and combustor 15 share at least one wall. The combustor 15, when attached to the reformer 9, closes the heat balance and provides additional heat required by the reformer. When no heat is required by the reformer, the combustor unit acts as a heat exchanger. Thus, the same combustor (i.e., burner) 15 may be used in both start-up and steady-state operation of the system 1. When using combustion catalysts coated on the conduit walls, the fuel may be introduced at several places in the combustion zone to avoid auto ignition and local heating.

In operation, a purified hydrocarbon fuel and steam mixture is fed to the lower end of the reformer 9 through the fuel inlet conduit 27. If desired, the fuel may be provided directly into the stack via a by-pass conduit 11 which by-passes the reformer 9. The reformed product is provided from the reformer 9 into the stack anode (fuel) inlet 13 through conduit 53. The spent fuel is exhausted from the stack through the anode exhaust conduit 31.

The air enters the stack through the cathode (air) inlet 19 and exits through exhaust opening 217 into the cathode (i.e., air) exhaust conduit 203. The system 1 is preferably configured such that the cathode exhaust (i.e., hot air) exits on the same side of the system as the inlet of the reformer 9. For example, as shown in FIG. 1B, since the mass flow of hot cathode exhaust is the maximum at the lower end of the device, it supplies the maximum heat where it is needed, at feed point of the reformer 9. In other words, the mass flow of the hot air exiting the stack is maximum adjacent to the lower portion of the reformer 9 where the most heat is needed. However, the cathode exhaust and reformer inlet may be provided in other locations in the system 1, such as to a steam generator. If desired, the hot combustor 15 exhaust may be provided into the steam generator through conduit 17 to heat the water in the generator to generate steam. The combustor exhaust may be provided into the steam generator in addition to or instead of one or more exhaust streams from the fuel cell stack 3.

Figure 2:
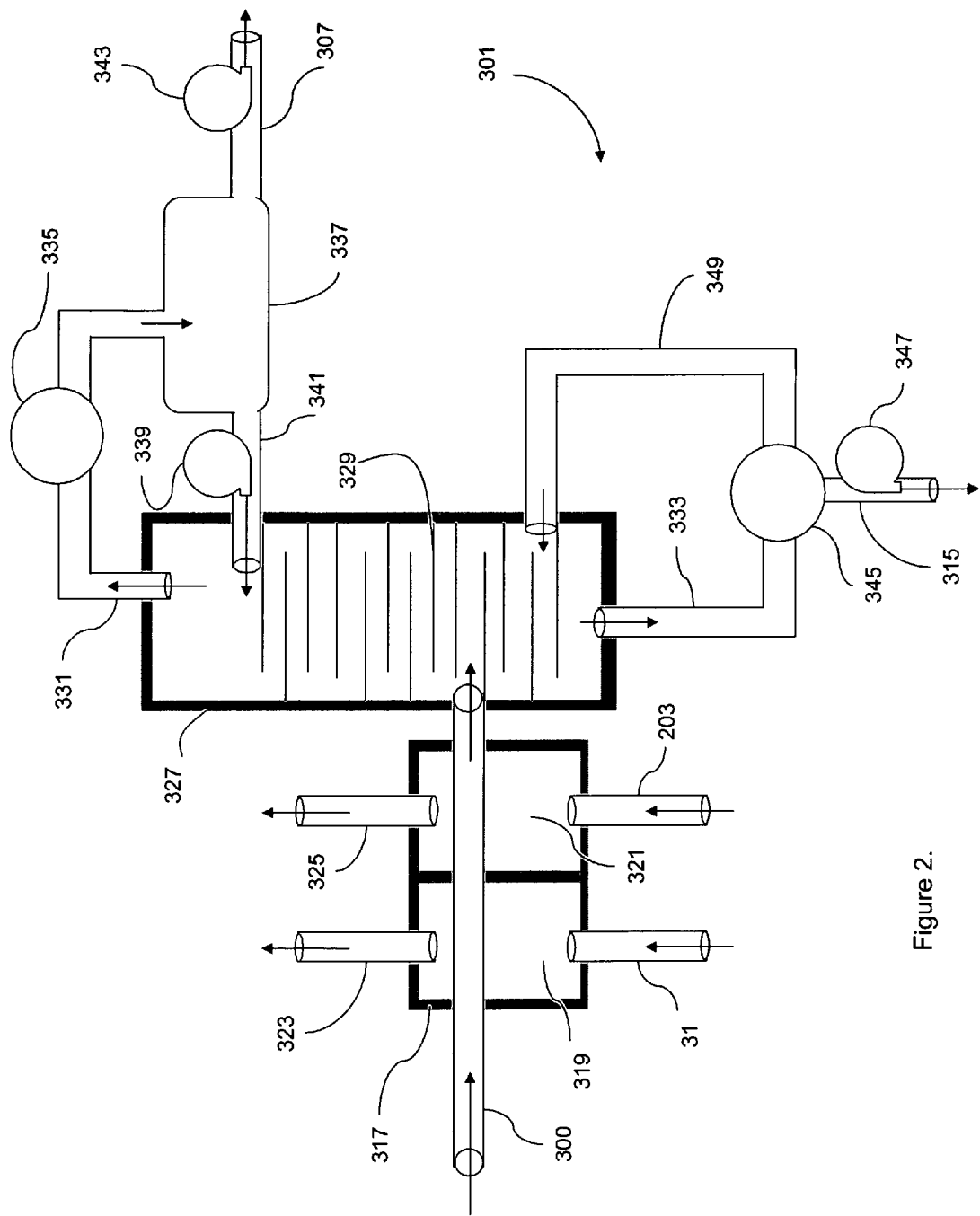
FIG. 2 is a schematic of a distillation system according to an embodiment of the invention that employs a fractional distillation column.

FIG. 2 illustrates an exemplary fuel purification unit 301. While the illustrated unit comprises a distillation unit, other purification devices which purify unpurified fuel are also contemplated. Distillation, and more particularly fractional distillation, is a process that separates a mixture into its component parts, or "fractions," by their boiling points. For instance, the purification of an ethanol-water mixture occurs by the separation of ethanol from water, where ethanol has a boiling point of 78.5° C. and is thus the "light" component, and water has a boiling point of 100° C. and is thus the "heavy" component. Purification of ethanol by fractional distillation alone can generally purify ethanol to approximately 96% ethanol and 4% water. Therefore, additional purification by other techniques may be required to achieve sufficient ethanol purity to power a fuel cell stack. Additional or alternate purification includes vacuum distillation, pressure-swing distillation, drying, or molecular sieve filtration. Preferably, these fuel purification techniques, alone or in combination, removes enough contaminants in the fuel for the product to be suitable for use as a fuel for the fuel cell stack.

FIG. 2 illustrates an exemplary fuel distillation system 301 comprising a fractional distillation unit. The unpurified fuel inlet conduit 300 provides the unpurified fuel through a heating chamber 317 which provides heat to the unpurified fuel. The unpurified fuel can be provided either continuously or intermittently, in order to provide either continuous distillation or batch distillation, respectively. Heat exchange occurs, for instance, through conductive or convective heating of the unpurified fuel inlet conduit 300 by contact with at least one of the exhaust streams of the fuel cell stack which are provided by conduits 31, 203. In one embodiment, conduits 31, 203 wrap around the outer surface of fuel inlet conduit 300. In another embodiment, the fuel exhaust stream is released from conduit 31 into a fuel exhaust reservoir 319 within the heating chamber 317 and convectively heats the fuel inlet conduit 300 before the fuel exhaust stream is removed from chamber 317 through a fuel stream outlet conduit 323. The heat of condensation of the anode exhaust stream can be used to heat the unpurified fuel inlet stream. In another embodiment, the air exhaust stream is released from conduit 203 into an air exhaust reservoir 321 within the heating chamber 317 and convectively heats the fuel inlet conduit 300 before the air exhaust stream is removed from chamber 317 through an air stream outlet conduit 325. If both air and fuel exhaust streams are provided, then, in one embodiment, each gas is provided into their respective reservoirs 319, 321 which are fluidly separated from each other within the chamber 317 in order to avoid mixing of the air and fuel exhaust streams. Preferably, the exhaust streams provide sufficient heat to the conduit 300 to raise the temperature of the unpurified fuel above its boiling point or above the boiling point of at least one of its components. As noted above, other heat transfer mechanisms, such as radiative, convective and/or other mechanisms, may also be used to heat the unpurified fuel inlet stream.

The unpurified fuel is fed from the conduit 300 into a fractionator column 327 which comprises a series of trays 329, which are the coolest at the bottom of the column 327 and the hottest at the top of the column 327. Standard operating conditions for commercial binary distillation operations are readily known in the art. See T. W. Mix et al., *Chem Eng. Prog.* 74(4) 49-55 (1978). For the binary mixture of ethanol azeotrope and water, the average relative volatility is 2.21, the average number of trays is 60, typical operating pressure is 15 psia, and the reflux-to-minimum-reflux ratio is 1.35. For the binary mixture of methanol and water, the average relative volatility is 3.27, the average number of trays is 60, typical operating pressure is 45 psia, and the reflux-to-minimum-reflux ratio is 1.31. A lower average relative volatility requires a greater amount of energy to be used in the distillation process for that binary mixture.

The fractionator column 327 is comprised of a plurality of distillation trays 329 on which vapor condenses as the fuel entering the column 327 cooled below its dew point or the dew point of at least one of its components. The component of the unpurified fuel with the lower boiling point accumulates at the top of the column 327 and escapes via a distillate outlet conduit 331, while the component with the higher boiling point condenses on the trays 329 and flows back down the column 327 and is removed from the column 327 by a bottoms outlet conduit 333. SOFCs can be operated on rather low purity hydrocarbon fuel. For example, water is required when steam reformation of the hydrocarbon fuel is employed before the reformed fuel is used in the fuel cells of the stack to generate electricity. Thus, the distillation system and method for SOFCs can be kept rather simple because not all water needs to be eliminated from the purified fuel. Furthermore, the purified evaporated fuel (i.e., the distillate vapor) in distillate outlet conduit 331 does not have to be condensed. Thus, the hydrocarbon fuel and water vapor may be provided from conduit 331 directly to the fuel cell stack(s) 3 (if the fuel cells are of the internal reformation type) or directly to the reformer 9 (if the fuel cells are of the external reformation type) for steam reformation. Preferably, the distillate vapor generated in the purification unit 301 contains a ratio of fuel to water vapor which is within a range which allows the vapor to be directly reformed using steam reformation, either directly in the fuel cells or in the external reformer. Thus, the temperature and other conditions in the purification unit 301 are preferably maintained to provide a distillate vapor having a ratio of fuel to water vapor within this predetermined ratio range.

Alternatively, the distillate vapor may be condensed. In this case, the vapor removed by the distillate outlet conduit 331 is fed through an optional total condenser 335 that is used to obtain saturated liquid reflux and liquid distillate. In one embodiment, the reflux comprises mostly water and the distillate comprises an ethanol azeotrope. In another embodiment, the reflux comprises mostly water and the distillate comprises mostly methanol. After being condensed in the condenser 335, the reflux and distillate pass through a reflux drum 337, which acts as a distribution point for the reflux and distillate. The reflux is drawn by a reflux pump 339 into a reflux conduit 341 and is then returned to the upper portion of the column 327. The downflowing reflux liquid provides cooling and condensation of the upflowing vapors, thereby increasing the efficacy of the distillation process. Concurrently, the distillate is drawn from the reflux drum 337 by a distillate pump 343 into the purified product conduit 307, for either additional purification or to power the fuel cell stack.

The condensate removed by the bottoms outlet conduit 333 is heated in a partial reboiler 345. Heat in the reboiler 345 may be provided by an external electrical heater, in which case the electrical power can be supplied by the fuel cell stack 3 via the electrical conduit 311, or by at least one exhaust stream of the fuel cell stack, for instance the air exhaust stream or the fuel exhaust stream via conduits 31, 203. The reboiler 345 is used to provide vapor boilup and a liquid bottoms product. The vapor boilup is removed through a vapor boilup conduit 349 and is returned to the lower portion of the column 327. The liquid bottoms product is removed by a bottoms pump 347 through the waste conduit 315. In one embodiment, the liquid bottoms is mostly water.

In an alternative embodiment, the heating chamber is a rounded container located at the base of the fractionator column, where the fuel is heated and optionally under vacuum pressure, before the vapor of the fuel passes up through the fractionator column. In another embodiment, the heating chamber is omitted. Instead, heat from the exhaust stream conduits 31 and/or 203 is provided directly to the column 327 by wrapping the conduits 31 and/or 203 around the exterior of the column 327 and/or by placing the conduits 31 and/or 203 adjacent to the column 327. If desired, in order to create a temperature gradient across the height of the column, the conduit(s) are wrapped more densely at the bottom of the column than at the top of the column, and/or greater insulation is provided at the top of the column than at the bottom of the column.

In one alternative embodiment, the distillation system comprises a pressure-swing distillation system. Pressure-swing distillation relies on the pressure dependency of azeotropes, such as ethanol-water. A reduced-pressure distillation first yields an ethanol-water mixture of more than 96% ethanol. Then, fractional distillation of this mixture at atmospheric pressure distills off the 96% azeotrope, leaving anhydrous ethanol. The power for the pumps and the vacuum system may be provided from the fuel cell stack 3 if the pumps and vacuum system are electrically connected to the stack 3, such as by the electrical conduit 311.

Figure 3:
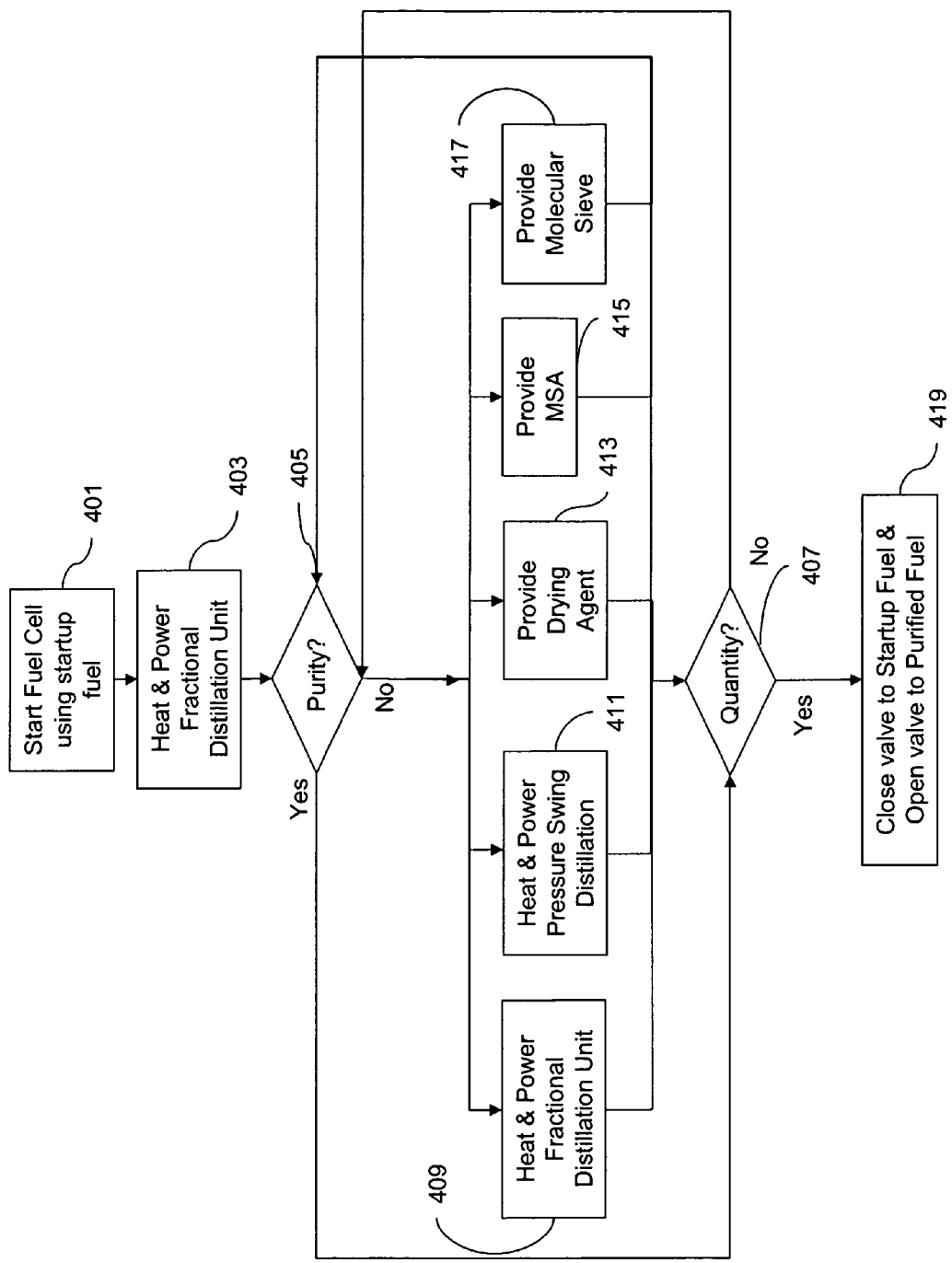
FIG. 3 is a flow chart of a method for operating a fuel cell system according to an embodiment of the invention that employs at least one fuel purification method.

FIG. 3 illustrates a method of operating a fuel cell system wherein the fuel cell stack provides electricity and heat to purify a fuel, which is then provided to the fuel cell stack. Preferably, the method is automated such that a computer control system monitors and implements the operational process steps. During startup step 401, the fuel cell stack 3 is powered by fuel that had been previously purified to levels suitable to power a fuel cell stack. This fuel used during the startup stage is purified prior to step 401 either by a fuel purification unit that is separate from the system 1 or by the fuel purification unit 301 when the system 1 was previously operated and the purified fuel was stored for future use. This fuel is provided to the fuel cell stack 3 by the startup fuel pump 25 while the splitter 309 is opened to allow this fuel to be provided to the stack 3.

In step 403, at least one of the exhaust streams of the fuel cell stack and/or other hot box components supplies heat and/or electricity to the fuel purification unit 301 in order to purify an unpurified fuel by fractional distillation. For instance, at least one exhaust stream exits the hot box 108 via conduits 31, 203, and electricity generated by the fuel cell is supplied by the electrical conduit 311. After the unpurified fuel is heated by the exhaust streams and the distillate passes through the column 327, the distillate is optionally collected and measured for purity in step 405. In one embodiment, the distillate is an oxygenated hydrocarbon fuel, for instance a hydroxylated hydrocarbon, such as ethanol. If the fuel is determined to be sufficiently pure to power a fuel cell stack in step 405, then the fuel is collected and its volume is optionally measured in step 407. If, however, the fuel is determined to be insufficiently pure in step 405, for instance because the fuel contains too much water and/or particulate matter, then the fuel is further purified by at least one additional purification technique.

In one embodiment, the fuel is further purified during step 409 by fractional distillation, whereby the heat and/or electricity required for the distillation process is optionally provided by the fuel cell stack and/or other hot box components. If the fuel product collected after step 409 is determined in step 405 to be sufficiently pure to power a fuel cell stack, then the fuel is collected and its volume is measured in step 407. If, however, the fuel is determined to be insufficiently pure in step 405, for instance because the fuel contains too much water and/or particulate matter, then the fuel is further purified by at least one additional purification technique.

In another embodiment, the fuel is further purified during step 411 by pressure-swing distillation, whereby the heat and/or electricity required for the distillation process is optionally provided by the fuel cell stack and/or other hot box components. If the fuel product collected after step 411 is determined in step 405 to be sufficiently pure to power a fuel cell stack, then the fuel is collected and its volume is measured in step 407. If, however, the fuel is determined to be insufficiently pure in step 405, for instance because the fuel contains too much water and/or particulate matter, then the fuel is further purified by at least one additional purification technique.

In another embodiment, the fuel is further purified during step 413 by the use of a drying agent, whereby the heat and/or electricity required for the drying process is optionally provided by the fuel cell stack and/or other hot box components. Suitable drying agents include, for instance, lime or salt. In one embodiment, the lime is calcium oxide, which when mixed with a fuel containing water, will form calcium hydroxide and thereby lower the concentration of water in the fuel. In another embodiment, salt dissolves a portion of the water content, thereby lowering the concentration of water in the fuel. If the fuel product collected after step 413 is determined in step 405 to be sufficiently pure to power a fuel cell stack, then the fuel is collected and its volume is measured in step 407. If, however, the fuel is determined to be insufficiently pure in step 405, for instance because the fuel contains too much water and/or particulate matter, then the fuel is further purified by at least one additional purification technique.

In another embodiment, the fuel is further purified during step 415 by the use of a material separation agent, whereby the heat and/or electricity required for the separation process is optionally provided by the fuel cell stack and/or other hot box components. In one embodiment, the material separation agent is benzene, which when mixed with an ethanol fuel containing water will form a ternary azeotrope with a boiling point of 64.9° C. This azeotrope is removed from the fuel, for instance, by fractional distillation. In another embodiment, the material separation agent is cyclohexane. If the fuel product collected after step 415 is determined in step 405 to be sufficiently pure to power a fuel cell stack, then the fuel is collected and its volume is measured in step 407. If, however, the fuel is determined to be insufficiently pure in step 405, for instance because the fuel contains too much water and/or particulate matter, then the fuel is further purified by at least one additional purification technique.

In another embodiment, the fuel is further purified during step 417 by the use of a molecular sieve, whereby the heat and/or electricity required for the purification process is optionally provided by the fuel cell stack and/or other hot box components. When fuel containing water is passed over the molecular sieve, which absorbs water from the mixture. The sieve is heated to remove the water and can be reused. The heat and/or electricity required to remove the absorbed water from the molecular sieve is optionally provided by the fuel cell stack and/or other hot box components. In one embodiment, the molecular sieve is a synthetic zeolite in pellet form. In another embodiment, the molecular sieve is selected from the group consisting of cornmeal, straw, and sawdust. If the fuel product collected after step 417 is determined in step 405 to be sufficiently pure to power a fuel cell stack, then the fuel is collected and its volume is measured in step 407. If, however, the fuel is determined to be insufficiently pure in step 405, for instance because the fuel contains too much water and/or particulate matter, then the fuel is further purified by at least one additional purification technique.

In step 407, the fuel is measured to determine whether the quantity of purified fuel is sufficient to power the fuel cell stack. If a sufficient volume of purified fuel has been collected, then the splitter 309 is adjusted, either manually or by a computer, to provide purified fuel to the fuel cell stack. In one embodiment, the splitter 309 is adjusted in step 419 such that after step 407 the fuel cell stack operates entirely off of fuel purified by the fuel purification unit 301. In another embodiment, the splitter 309 is adjusted in step 419 such that after step 407 the fuel cell stack operates concurrently off of both the fuel provided by the startup pump 25 and the fuel purified by the fuel purification unit 301. If, however, the quantity of purified fuel is determined in step 407 to be insufficient to power the fuel cell stack, then the volume is monitored until such time as the volume is sufficient to power the fuel cell stack either in whole or in part by the purified fuel. If desired, the fuel purification unit 301 may generate purified fuel in excess of that required for stack 3 operation. In that case, the purified hydrocarbon fuel may be stored for later use in the system 1, such as for stack 3 start-up or for periods when the stack 3 requires a high amount of fuel. Alternatively, the excess purified fuel may be removed from the system 1 and stored and/or delivered as a separate product. For example, the excess fuel may be collected in one or more storage vessels and provided to a separate location for use in an another hydrocarbon fuel using device. Alternatively, the excess fuel may be delivered from the system 1 to another hydrocarbon using device via a pipe or another conduit.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

What is claimed is:

1. A fuel cell system comprising:
   a fuel cell stack;
   a first distillation unit configured to receive a fuel source, wherein the fuel cell stack provides heat to the first distillation unit using at least one exhaust stream of the fuel cell stack and
   a controller programmed to:
      control a temperature in the first distillation unit to produce a distillate vapor from the fuel source having remaining water vapor and a ratio of fuel to water vapor;
      determine when the ratio of fuel to water vapor allows the vapor to be directly reformed using steam reformation;
      provide the distillate vapor containing the remaining water vapor from the first distillation unit to the fuel cell stack during fuel cell system operation when the ratio of fuel to water vapor as determined by the controller allows the vapor to be directly reformed steam reformation; and
      provide the distillate vapor containing the remaining water vapor from the first distillation unit for additional distillation when the ratio of fuel to water vapor as determined by the controller does not allow the vapor to be directly reformed using steam reformation, wherein the additional distillation is conducted in a second distillation unit that uses a process that differs from a process used by the first distillation unit.

2. The system of claim 1, further comprising at least one exhaust stream conduit connecting at least one exhaust opening of the fuel cell stack to the first distillation unit, wherein the at least one exhaust stream conduit provides at least one exhaust stream from the fuel cell stack to the first distillation unit during fuel cell system operation.

3. The system of claim 2, wherein the at least one fuel cell exhaust stream conduit comprises an air exhaust stream conduit.

4. The system of claim 2, wherein the at least one fuel cell exhaust stream conduit comprises a fuel exhaust stream conduit.

5. The system of claim 2, wherein the at least one fuel cell exhaust stream conduit comprises an air exhaust stream conduit and a fuel exhaust stream conduit.

6. The system of claim 1, wherein the fuel cell stack is comprised of high temperature fuel cells.

7. The system of claim 6, wherein the fuel cells are solid oxide fuel cells.

8. The system of claim 1, further comprising an oxygenated hydrocarbon fuel source which is fluidly connected to the first distillation unit.

9. The system of claim 8, wherein the fuel source comprises an ethanol or methanol fuel source.

10. The system of claim 1, wherein the first and second distillation units are selected from the group consisting of a fractional distillation unit, a vacuum distillation unit, a pressure-swing distillation unit, a drying unit, a material separation agent, and a molecular sieve unit.

11. The system of claim 1, wherein the fuel cell stack is configured to reform the distillate vapor.

12. The system of claim 1, wherein the fuel cell system further comprises a reforming unit and the reforming of the distillate vapor is performed by the reforming unit.

* * * * *